(12) United States Patent
Zhodzishsky et al.

(10) Patent No.: US 11,209,552 B2
(45) Date of Patent: Dec. 28, 2021

(54) METHOD AND APPARATUS FOR IMPROVING THE QUALITY OF POSITION DETERMINATION USING GNSS DATA

(71) Applicant: Topcon Positioning Systems, Inc., Livermore, CA (US)

(72) Inventors: Mark Isaakovich Zhodzishsky, Moscow (RU); Viktor Abramovich Veitsel, Moscow (RU); Mikhail Arkadievich Mironov, Moscow (RU); Alexey Vasilievich Bashaev, Moscow (RU); Amir Salikhovich Bakeev, Moscow (RU); Vladimir Viktorovich Beloglazov, Moscow (RU); Sergey Vladislavovich Averin, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 549 days.

(21) Appl. No.: 16/332,447

(22) PCT Filed: Jan. 11, 2019

(86) PCT No.: PCT/RU2019/000008
§ 371 (c)(1),
(2) Date: Mar. 12, 2019

(87) PCT Pub. No.: WO2020/145839
PCT Pub. Date: Jul. 16, 2020

(65) Prior Publication Data
US 2021/0356604 A1 Nov. 18, 2021

(51) Int. Cl.
*H04W 24/00* (2009.01)
*G01S 19/43* (2010.01)
*G01S 19/23* (2010.01)

(52) U.S. Cl.
CPC .............. *G01S 19/43* (2013.01); *G01S 19/23* (2013.01)

(58) Field of Classification Search
CPC ................................. G01S 19/43; G01S 19/23
(Continued)

(56) References Cited

U.S. PATENT DOCUMENTS 9,244,172 B2 * 1/2016 O'Connor ............... G01S 19/28
9,285,479 B2 * 3/2016 O'Connor ............... G01S 19/42
(Continued)

*Primary Examiner* — Don N Vo
(74) *Attorney, Agent, or Firm* — Bardmesser Law Group

(57) ABSTRACT

GNSS receiver which includes RF front end, connected to GNSS antenna, an ADC converting the satellite signals into digitized signals, a digital section, including a processor receiving the digitized signals, forming raw measurements with pseudoranges measured between the antenna and satellites, and estimating target parameters, including receiver position and receiver time offset by (i) extrapolating the target parameters from previous epoch to current epoch using a dynamic model; (ii) computing a quasi-measurement for each satellite based on extrapolated target parameters and GNSS satellite positions; (iii) detecting and rejecting raw measurements with anomalous errors by testing differences between the raw measurements and respective quasi-measurements against predefined thresholds; (iv) substituting quasi-measurements for rejected raw measurements; (v) estimating target parameters using unrejected raw measurements and substituted quasi-measurements; (vi) outputting estimated target parameters.

19 Claims, 5 Drawing Sheets

(58) Field of Classification Search
USPC .................................................... 455/456.1
See application file for complete search history.

(56) References Cited

U.S. PATENT DOCUMENTS

2010/0182195 A1* 7/2010 Garin ................... G01S 5/0284
                                                                               342/357.22
2015/0234093 A1* 8/2015 Crowley ................ G01W 1/00
                                                                                702/3

* cited by examiner

METHOD AND APPARATUS FOR IMPROVING THE QUALITY OF POSITION DETERMINATION USING GNSS DATA

BACKGROUND OF THE INVENTION

Field of the Invention

The invention relates to processing GNSS signals received in challenging environments, such as urban canyons, under a tree canopy, etc.

Description of the Related Art

Global Navigation Satellite Systems (GNSS) are used for determining target parameters, such as position, velocity, and time (PVT). Currently deployed GNSS are the United States Global Positioning System (GPS) and the Russian GLONASS. Other global navigation satellite systems, such as the European GALILEO system, or Beidou of China are under development.

In GNSS-related applications, a navigation receiver receives and processes radio signals transmitted by satellites located within a line-of-sight of the receiver. The satellite signals comprise carrier signals modulated by pseudo-random binary codes.

The receiver measures time delays and phases of the incoming signals relative to locally generated replicas of these signals. As result, code phase and carrier phase GNSS measurements are generated. These measurements are referred to as pseudo-ranges, as they differ from the actual ranges (distances) between the receiver and the satellites due to an offset between the time scales of the GNSS and the receiver.

The set of code phase and carrier phase pseudo-range measurements is referred to as raw measurements. When raw measurements are accompanied with digital data received from GNSS satellites, such data set is referred to as raw GNSS data, or GNSS data, for short.

If signals are received from a sufficiently large number of satellites, then the measured pseudo-ranges can be processed to determine receiver's positional components (coordinates) and the offset between the time scales of the GNSS satellites and the receiver.

This operational mode is referred to as a stand-alone mode, since the measurements are determined by a single receiver.

A stand-alone system typically provides meter-level accuracy of positioning. This accuracy can be improved, if carrier phase measurements are used in addition to code phase measurements.

For example, an approach to using carrier phase increments in a stand-alone system to dead-reckon user position with high accuracy is described in U.S. Pat. No. 7,522,099B2.

Alternatively, to improve the accuracy of positioning, differential navigation (DN) systems have been developed. In a DN system, the position of a user is determined relative to a base station, also referred to as a base. A user in a DN system is referred to as a rover. The base is typically fixed, and the coordinates of the base are precisely known, for example, by surveying.

The base contains a navigation receiver that receives satellite signals and that can calculate the corrections to raw measurements based on the known base position. In some DN systems, the raw measurements of the base can serve as corrections. The rover also contains a navigation receiver that receives GNSS satellite signals.

Corrections generated at the base are transmitted to the rover via a communications link. To accommodate a mobile rover, the communications link is often a wireless link. The rover processes the corrections received from the base, along with raw measurements taken with its own receiver, to improve the accuracy of determining its position.

Accuracy is improved in the differential navigation mode because errors incurred at the side of receiver at the rover and at the side of receiver at the base are highly correlated. Since the coordinates of the base are accurately known, measurements from the base can be used for calculating corrections, thus compensating the errors at the rover.

Accuracy of determined target parameters is dependent on errors in raw data. These errors can be normal, i.e., corresponding to initial assumptions on accuracy of the raw data, and these errors can be abnormal. In some cases, if errors in raw data are abnormally large, this could prevent the GNSS receiver from accurately calculating position. Thus, a problem of detecting and isolating data with abnormal errors is critical for all GNSS applications.

Therefore, an object of the present invention is maintaining good accuracy of target parameters determination in the presence of abnormal errors in GNSS data.

Abnormal errors in raw measurements might occur as result of GNSS signal obstructions or radio interference. Another reason for abnormal errors can be signal reflections from near-by obstacles. Also, satellite ephemeris and clock data might contain abnormal errors, which negatively impact accuracy of target parameters determination.

In some cases, raw measurements with abnormal errors (referred to as "anomalous measurements") can be discovered based on analysis of signal-to-noise ratio (SNR). A technique for measuring SNR is described in U.S. Pat. No. 8,368,593B2. However, SNR analysis alone is not sufficient for reliable detection of anomalous measurements, and for improving the accuracy of target parameters determination.

For example, a principle of measurement redundancy can be used to detect and isolate anomalous measurements (U.S. Pat. No. 6,861,979B1). Filtering (smoothing) can be used to improve the accuracy of target parameters determination due to suppression of measurement noise and multipath errors (U.S. Pat. No. 7,439,908B1). Smoothing can be applied both to measured pseudo-ranges and to computed receiver positions. Smoothing can be implemented as with widely-known Kalman filter, or with a similar, less complicated filtering algorithm with constant coefficients (U.S. Pat. No. 7,710,316B1).

The invention described herein is directed to improving reliability and robustness of target parameters determination regardless of the filtering technique used.

A publication "Bridging GPS Outages in the Agricultural Environment using Virtualite Measurements" by Anthony Cole et al. (Proceedings of IEEE/ION PLANS 2008, May 6-8, 2008) describes a technique of simulating measurements from virtual, i.e., nonexistent satellites, when a total number of tracked signals gets low. In order to simulate these virtual satellites user position is predicted with the inertial navigation system (INS).

SUMMARY OF THE INVENTION

The invention described herein is not based on using INS, and does not deal with lost observations, but is directed to improving the quality of those that exist.

One aspect of the present invention involves a technique with the following steps:
- analyzing the quality of raw GNSS measurements;
- rejecting those GNSS measurements, which are treated as anomalous;
- replacing rejected measurements with parameters referred to as "quasi-measurements", computed based solely on GNSS data.

This technique is applicable to both code phase and carrier phase measurements, and to both stand-alone and differential modes.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the embodiments of the present invention, examples of which are illustrated in the accompanying drawings.

The invention is primarily directed to a method for generating a time series of values, which are substituted for detected anomalous raw measurements, in order to maintain the capability of outputting the vector of target parameters with acceptable accuracy.

Navigation signals pass through what may be termed phases of primary and secondary processing within a receiver. During primary processing, a set of raw pseudo-range code phase and carrier phase measurements is formed along with digital data, like SNR, satellite clock and ephemeris data, satellite health indicators, etc.

During the secondary processing, a vector of target parameters is computed based on results of primary processing.

The discussion below is primarily focused on the phase of secondary processing.

Figure 1:
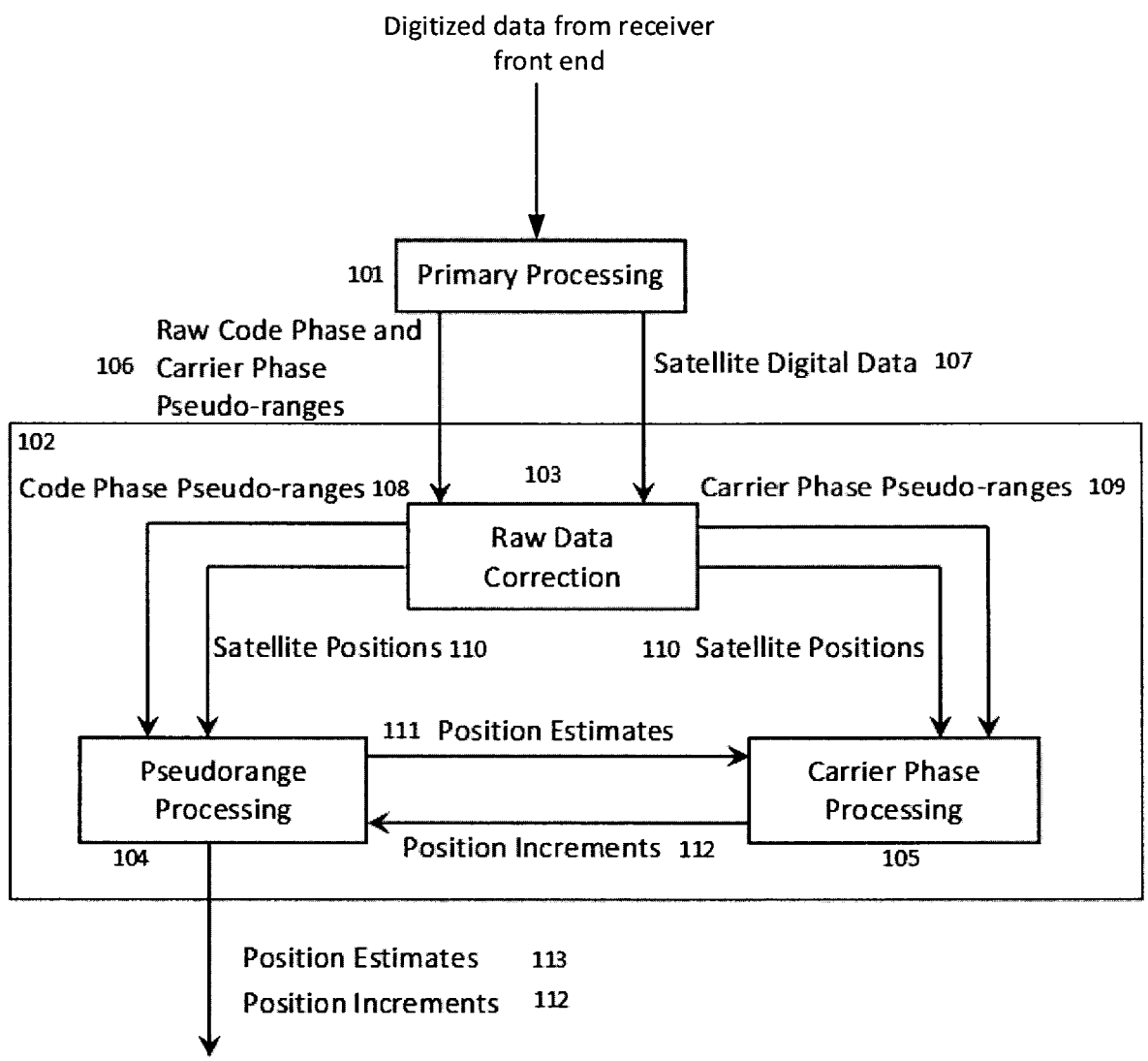
FIG. 1 shows a block diagram of the secondary processing, with improvements claimed within the current invention.

FIG. 1 shows a block diagram of the secondary processing. The primary processing block 101 receives digitized data from receiver front-end and generates raw measurements and digital information for every GNSS satellite, whose signal is received, along with the satellite digital data, like SNR, satellite clock and ephemeris data, satellite health indicators, etc.

Raw code phase and carrier measurements 106 along with satellite digital data 107 arrive to the secondary processing block 102.

Within the secondary processing block 102, the raw measurements and the satellite data arrive at block 103, where all these data accept various corrections, and are made ready for further processing. The list of manipulations with these data is typical and is described in relevant GNSS Interface Control Documents. For example, for GPS, this is "ICD-GPS-200C, Interface Control Document, 10 Oct. 1993", incorporated herein by reference in its entirety. This list can include extrapolation of GNSS satellite ephemeris and clock parameters to the needed time instants, introducing corrections for Earth rotation and relativistic effects, accounting for delays due to signal propagation through ionosphere and troposphere, etc.

Corrected code phase pseudo-ranges 108 arrive from 103 to 104, and corrected carrier phase pseudo-ranges 109 are received from 103 at 105. Also, satellite positions 110, computed for the moment of signal transmission arrive from 103 to 104 and to 105.

In 104, rough user positions estimates 111 are computed, which are provided to 105. In 105 position increments 112 are evaluated, which are sent back to 104 for producing smoothed user positions. Smoothed user positions 113 and position increments 112 are viewed as target parameters, and are output to external user.

The invention relies on the idea of quasi-measurements, which are generated in 104 and 105 in FIG. 1. The definition of quasi-measurements will be given further in the text.

Let us denote:

$\varphi_i^j$—raw carrier phase measurement on i-th epoch for j-th signal;

$\overline{\varphi}_i^j$—carrier phase quasi-measurement on i-th epoch for j-th signal;

$\rho_i^j$—raw code phase measurement on i-th epoch for j-th signal $\overline{\rho}_i^j$—code phase quasi-measurement on i-th epoch for j-th signal;

$$\vec{Y}_i = \begin{vmatrix} \rho_i^1 \\ \rho_i^2 \\ \dots \\ \rho_i^N \end{vmatrix} - \text{vector of code phase measurements on } i\text{-th epoch;}$$

N—number of signals on i-th epoch;

$$\vec{\overline{Y}}_i = \begin{vmatrix} \overline{\rho}_i^{=1} \\ \overline{\rho}_i^{=2} \\ \dots \\ \overline{\rho}_i^{=N} \end{vmatrix} - \text{vector of code phase quasi-measurements on } i\text{-th epoch;}$$

$\Delta \vec{Y}_{i/i-1}$—vector of increments for carrier phase measurements from i-1 to i-th epoch;

$\Delta T_{i/i-1}$—time interval between i-1 and i-th epoch;

$$\Delta \vec{Y}_{i/i-1} = \begin{vmatrix} \Delta \varphi_{i/i-1}^{=1} \\ \Delta \varphi_{i/i-1}^{=2} \\ \ldots \\ \Delta \varphi_{i/i-1}^{=N} \end{vmatrix} - \text{vector of increments for carrier}$$

phase quasi-measurements from $i-1$ to $i$-th epoch;

$$\vec{X} = \begin{vmatrix} \varphi_i \\ \lambda_i \\ h_i \\ q_i \end{vmatrix} - \text{vector of position components on } i\text{-th epoch;}$$

$\varphi_i$—latitudinal position offset ([m]) of the solution with respect to a local origin on i-th epoch;

$\lambda_i$—longitudinal position offset ([m]) of the solution with respect to a local origin on i-th epoch;

$h_i$—altitudinal position offset ([m]) of the solution with respect to a local origin on i-th epoch;

$q_i$—offset between receiver clock and GNSS time on i-th epoch;

$\overline{\vec{X}}_i$—vector of smoothed position components on i-th epoch;

$\vec{\widetilde{X}}_i$—vector of extrapolated position components on i-th epoch;

$$\Delta \vec{X}_{i/i-1} = \begin{vmatrix} \Delta \varphi_{i/i-1} \\ \Delta \lambda_{i/i-1} \\ \Delta h_{i/i-1} \\ \Delta q_{i/i-1} \end{vmatrix} -$$

vector of positional offset increments from $i-1$ to $i$-th epoch;

$\Delta \varphi_{i/i-1}$—latitudinal position offset increment from i-1 to i-th epoch;

$\Delta \lambda_{i/i-1}$—longitudinal position offset increment from i-1 to i-th epoch;

$\Delta h_{i/i-1}$—altitudinal position offset increment from i-1 to i-th epoch;

$\Delta q_{i/i-1}$—increment of offset between receiver clock and GNSS time from i-1 to i-th epoch;

$\Delta \overline{\vec{X}}_{i/i-1}$—vector of smoothed position component increments from i-1 to i-th epoch;

$\Delta \vec{\widetilde{X}}_{i/i-1}$—vector of extrapolated position component increments from i-1 to i-th epoch;

When several GNSS received are used for data processing, the vectors $\vec{X}_i$ and $\Delta \vec{X}_{i/i-1}$ should include additional variables identical to $q_i$ and $\Delta q_{i/i-1}$, describing clock offsets of the receiver time scale with respect to a relevant GNSS.

Within the context of this application, latitudinal, longitudinal, altitudinal position offsets with respect to a local origin are viewed as the unknowns to be found. These offsets are measured within the Earth-Centered Earth-Fixed (ECEF) reference frame, e.g., WGS-84. Longitudinal and latitudinal offsets are represented in angular measurement units, like radians. At the same time, taking into account close proximity to a local origin, they can be represented in linear units, for example, in meters. Using these offsets as unknowns is beneficial as they can be modelled and predicted with less dynamic errors for the user, which travels over the Earth surface (what represents the majority of GNSS applications).

However, the principles described herein are applicable to the unknowns represented in ECEF Cartesian system, or in any other reference frame.

In blocks 104 and 105 in FIG. 1 positions components and position component increments are evaluated based on raw measurements. Position component evaluation is based on Least Squares Method (LSM). Below are the general LSM equations.

Let us assume, there is a function F, describing the relation between a vector of unknowns ($\vec{X}_i$) and a vector of raw measurements ($\vec{Y}_i$) on i-th epoch.

$$\vec{Y}_i = F(\vec{X}_i) \quad (1)$$

The F-function is not linear, and one of the approaches to resolve the equation is to linearize the (1). It can be done with Tailor series expansion, maintaining the 1-st order terms:

$$\vec{Y}_i = \vec{Y}_{0i} + \frac{\partial \vec{Y}_i}{\partial \vec{X}_i} \delta \vec{X}_i \quad (2)$$

where:

$\delta \vec{X} = \vec{X}_i - \vec{X}_{0i}$ is a difference between some initial guess (approximation) about $\vec{X}_i$ and its estimation result $\vec{X}_i$;

$\vec{X}_{0i}$ is approximation to $\vec{X}_i$ $\vec{Y}_{0i}$ is approximation to $\vec{Y}_i$ computed with $\vec{X}_{0i}$.

In case of using latitudinal, longitudinal, altitudinal position offsets as unknowns, vector $\vec{X}_{0i}$ represents the local origin.

Let us denote:

$$\delta \vec{Y}_i = \vec{Y}_i - \vec{Y}_{0i} \quad (3)$$

Then, equation (1) would transform to matrix form as follows:

$$\delta \vec{Y}_i = H \delta \vec{X}_i \quad (4)$$

Where H is a matrix of partial derivatives.

In this particular case, the H-matrix has following composition:

$$H = \begin{vmatrix} \frac{\partial \varphi_i}{\partial \rho_i^1} & \frac{\partial \lambda_i}{\partial \rho_i^1} & \frac{\partial h_i}{\partial \rho_i^1} & 1 \\ \frac{\partial \varphi_i}{\partial \rho_i^2} & \frac{\partial \lambda_i}{\partial \rho_i^2} & \frac{\partial h_i}{\partial \rho_i^2} & 1 \\ \ldots & \ldots & \ldots & \ldots \\ \frac{\partial \varphi_i}{\partial \varphi_i^N} & \frac{\partial \lambda_i}{\partial \rho_i^N} & \frac{\partial h_i}{\partial \rho_i^N} & 1 \end{vmatrix} \quad (5)$$

The H-matrix components are determined explicitly as follows:

$$\frac{\partial \varphi_i}{\partial \rho_i^j} = -\cos El_i^j \times \cos Az_i^j \quad (6)$$

$$\frac{\partial \lambda_i}{\partial \rho_i^j} = -\cos El_i^j \times \sin Az_i^j, \quad (7)$$

-continued $$\frac{\partial h_i}{\partial \rho_i^j} = -\sin El_i^j \quad (8)$$

where $El_i^j$ and $Az_i^j$ are GNSS satellite elevation and azimuth respectively on i-th epoch for i-th signal.

According to LSM approach, equation 4 is resolved as follows:

$$\delta \vec{X}_i = (H^T R_{\rho,i} H)^{-1} H^T R_{\rho,i} \delta \vec{Y}_i \quad (9)$$

where $R_{\rho,i}$ is a weight matrix for code phase pseudo-range measurements.

Similarly, for position component increments the solution is the following:

$$\delta \Delta \vec{X}_{i/i-1} = (H^T R_{\Delta\varphi,i} H)^{-1} H^T R_{\Delta\varphi,i} \delta \Delta \vec{Y}_{i/i-1} \quad (10)$$

where $R_{\Delta\varphi,i}$—a weight matrix for increments of carrier phase pseudo-range measurements.

As result, approximations are updated to get the final solution for $\vec{X}_i$ и $\Delta \vec{X}_{i/i-1}$:

$$\vec{X}_i = \vec{X}_{0i} + \delta \vec{X}_i \quad (11)$$

$$\Delta \vec{X}_{i/i-1} = \Delta \vec{X}_{0i/i-1} + \delta \Delta \vec{X}_{i/i-1} \quad (12)$$

where $\Delta \vec{X}_{0i/i-1}$—approximation to $\Delta \vec{X}_{i/i-1}$

Measurement weight matrices are diagonal, with components proportional to expected dispersions of errors of the relevant measurements. Measurement errors, often, are inversely proportional to SNR ratio. As such, one of the approaches to assigning weights can be as follows:

$$r_{\rho_i}^j = SNR_i^j \quad (13)$$

where
$r_{\rho_i}^j$ is a component of $R_{\rho,i}$, corresponding to j-th signal;
$SNR_i^j$ is the SNR value on i-th epoch for j-th signal;

An alternative approach to assigning weights can be based on the following relationship:

$$r_{\rho_i,j} = SNR_i^j \cdot (\sin El_i^j + 0.001) \quad (14)$$

Assigning weights for increments of carrier phase pseudo-range measurements can also be made in accordance with (13) or (14).

Figure 2:
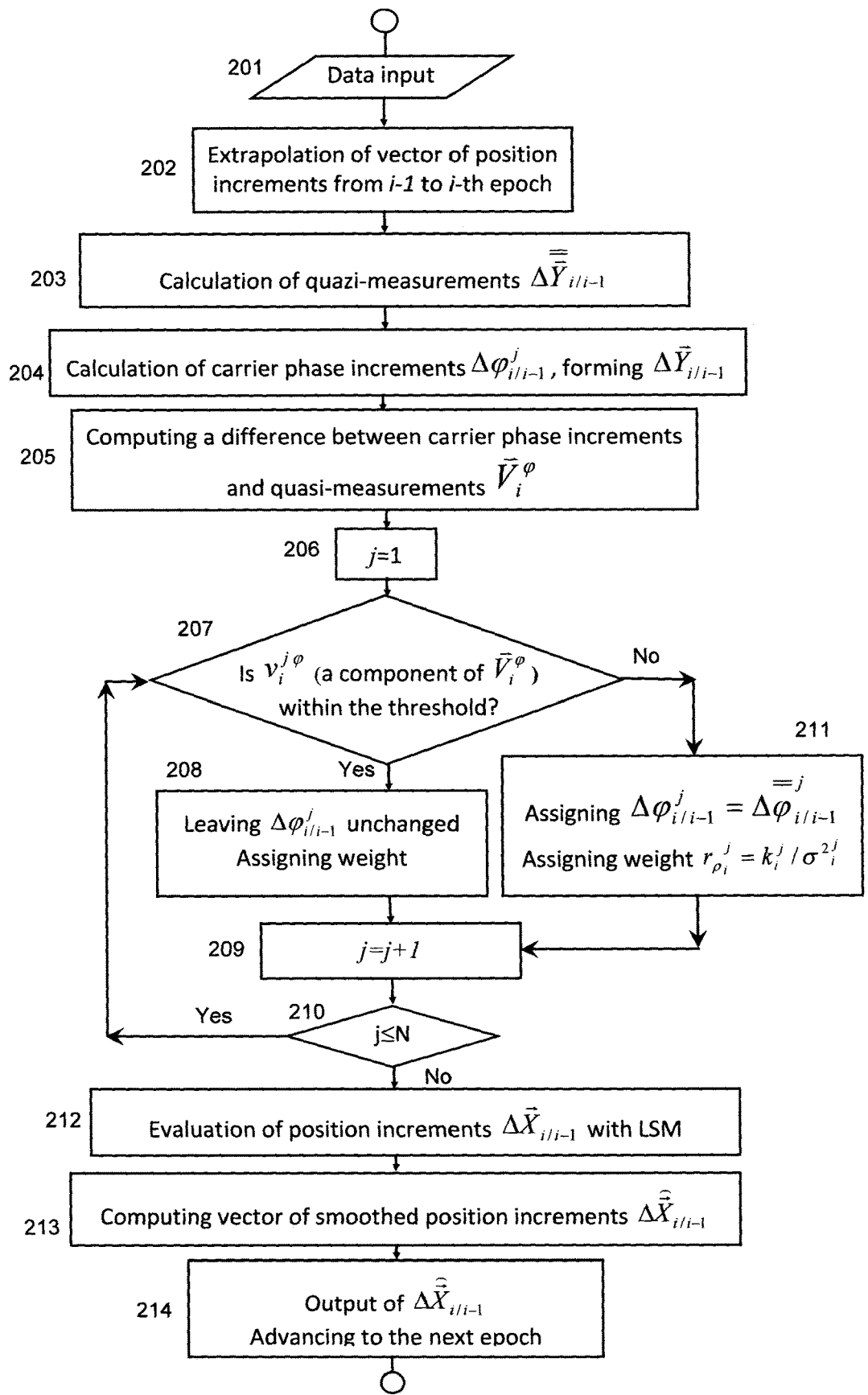
FIG. 2 shows a flowchart for carrier phase pseudo-range measurement processing.

FIG. 2 shows a flowchart for carrier phase pseudo-range measurement processing.

Input data 201 on i-th epoch are:

$\vec{X}_{i-1}$ is an evaluated position components on epoch i−1;

$\Delta \vec{X}_{i-1/i-2}$ is an evaluated smoothed position component increments from epoch i−2 to epoch i−1;

$\Delta \vec{Y}_{i/i-1}$ is a vector of increments for carrier phase measurements from i−1 to i-th epoch;

$\Delta T_{i/i-1}$ is a time interval between epochs i−1 and i;

GNSS satellite positions, computed for signal transmission moments, appropriate to epochs i, i−1, i−2.

Extrapolation of position components and position component increments is performed in 202. Extrapolation is performed in accordance with a certain model, and one of the approaches is to use the 1-st order model:

$$\Delta \vec{X}_{i/i-1} = \Delta \vec{X}_{i-1/i-2} \quad (15)$$

$$\vec{X}_i = \vec{X}_{i-1} + \Delta \vec{X}_{i/i-1} \times \Delta T_{i/i-1} \quad (16)$$

In 203, a calculation of parameters called quasi-measurements is performed.

Quasi-measurements for increments of carrier phase pseudo-ranges are computed using extrapolated increments of positional components:

$$\Delta \vec{\bar{Y}}_{i/i-1} = H \Delta \vec{X}_{i/i-1} \quad (17)$$

In 204, a vector of carrier phase pseudo-range increments is computed:

$$\Delta \vec{Y}_{i/i-1} = \begin{vmatrix} \Delta\varphi_{i/i-1}^1 \\ \Delta\varphi_{i/i-1}^2 \\ \dots \\ \Delta\varphi_{i/i-1}^N \end{vmatrix} = \begin{vmatrix} \varphi_i^1 \\ \varphi_i^2 \\ \dots \\ \varphi_i^N \end{vmatrix} - \begin{vmatrix} \varphi_{i-1}^1 \\ \varphi_{i-1}^2 \\ \dots \\ \varphi_{i-1}^N \end{vmatrix} \quad (18)$$

In 205, a vector of differences between carrier phase pseudo-range increments and quasi-measurements for increments of carrier phase pseudo-ranges is computed:

$$\vec{V}_i^\varphi = \Delta \vec{Y}_{i/i-1} - \Delta \vec{\bar{Y}}_{i/i-1} \quad (19)$$

Then, every component of $\vec{V}_i^\varphi$ should be tested against a threshold, which is implemented in a cycle of operations of 206-211.

The cycle for every y-th signal is initiated in 206.

In 207, a comparison is made of absolute values of $\vec{V}_i^\varphi$-vector components with respect to a threshold ε:

$$|v_i^{j\varphi}| \leq \varepsilon \quad (20)$$

where $v_i^{j\varphi}$ is a component of $\vec{V}_i^\varphi$-vector for j-th signal.

The threshold value ε should be chosen based on observation conditions and a measurement quality. For example, it can be chosen close to GPS LI wavelength value (20 cm).

If condition in 207 is satisfied, the relevant component of $\Delta \vec{Y}_{i/i-1}$ remains unchanged (block 208), and this component is assigned a weight computed as:

$$r_{\varphi_i}^j = 1/\sigma_i^{2j} \quad (21)$$

where
$r_{\Delta\varphi_i}^j$ is a diagonal component of the $R_{\Delta\varphi,i}$-matrix, corresponding to j-th signal on i-th epoch;
$\sigma_i^{2j}$ is a dispersion of j-th signal on i-th epoch.

Then, control goes to 209 where the next measurement is chosen for analysis.

In 210, a check is made if all components of the $\vec{V}_i^\varphi$-vector had been tested, and if "yes", control goes to 212. If "no"—a cycle is repeated with a next measurement.

If condition in 207 is not satisfied, the relevant component of the $\Delta \vec{Y}_{i/i-1}$-vector is updated in 211 as follows:

$$\Delta\varphi_{i/i-1}^j = \Delta\bar{\varphi}_{i/i-1}^j \quad (22)$$

and a new weight is assigned:

$$r_{\Delta\varphi_i}^j = k_i^j/\sigma_i^{2j} \quad (23)$$

where $k_i^j$ is degradation coefficient, chosen empirically within the interval of 0 to 1.

After that, the next measurement is chosen for analysis in 209.

Within the described algorithm, a check (20) can be supplemented with more checks. For example, SNR value for every measurement can be tested against a threshold:

$$SNR_i^j \leq \eta \quad (24)$$

A threshold value η can be chosen based on observation conditions and equipment specifics. For example, for GPS LI bandwidth this threshold can be chosen equal to 30 dBHz.

In 212, an evaluation of position component increments is made with help of LSM (equations (10) and (12)). In 213, a smoothing of position component increments is implemented. Smoothed evaluations of position component increments are output to 104 in FIG. 1, and all the operations shown in FIG. 2 are repeated for data of the next epoch.

Smoothing of position component increments can be implemented in a variety of ways. Smoothing filter can of the 1-st, 2-nd, or higher order. Below, an example of the algorithm is given, based on adaptivity principles.

Input data for this algorithm are the evaluated position component increments $\Delta \vec{X}_{i/i-1}$, their extrapolated values $\Delta \vec{X}_{i/i-1}$, and their smoothed values evaluated at previous epochs $\Delta \vec{\bar{X}}_{i-1/i-2}$.

The first step of the smoothing algorithm is the extrapolation in accordance with (15). Then, a mismatch vector is computed for position increments:

$$\vec{Z}_{i/i-1} = \Delta \vec{X}_{i/i-1} - \Delta \vec{\tilde{X}}_{i/i-1} \quad (25)$$

Components of the mismatch vector should be tested against a threshold:

$$\text{abs}(z_{i/i-1}^k) \le w_{i/i-1}^k \quad (26)$$

where:

"abs" means computation of absolute values of $\vec{Z}_{i/i-1}$-vector components.

$z_{i/i-1}^k$ is the k-th component of the $\vec{Z}_{i/i-1}$-vector;

k=1;m, where m—number of unknowns (4 for the case of one GNSS); and $w_{i/i-1}^k$ is a threshold.

Threshold values $w_{i/i-1}^k$ can be chosen in a variety of ways. These values should be correspondent to errors of evaluated $\Delta \vec{X}_{i/i-1}$ and $\Delta \vec{\tilde{X}}_{i/i-1}$. For the sake of simplicity, it can be assumed that errors of the smoothed values of $\Delta \vec{\tilde{X}}_{i/i-1}$ are negligible compared to errors of $\Delta \vec{X}_{i/i-1}$, as such the latter ones should determine the threshold values.

The errors of $\Delta \vec{X}_{i/i-1}$-vector can be evaluated based on equation (10):

$$Q_{i/i-1} = (H^T R_{\Delta\varphi,i} H)^{-1} \quad (27)$$

where $Q_{i/i-1}$ is the error covariance matrix for position component increments between epochs i−1 and i.

Based on (27), thresholds are assigned as follows:

$$w_{i/i-1}^k = l \times q_{kk} \quad (28)$$

where $q_{kk}$ is the relevant diagonal component of the $Q_{i/i-1}$-matrix;

l is some empirical coefficient.

A value of l should be chosen based on observation conditions, for example, its value can be set to 3 (according to 3-sigma rule).

If condition (26) is satisfied, a smoothing is made as follows:

$$\Delta \vec{\bar{X}}_{i/i-1} = \Delta \vec{\tilde{X}}_{i/i-1} + K_i \cdot \vec{Z}_{i/i-1} \quad (29)$$

where $K_i$ is a certain empirical coefficient. In the simplest implementation:

$$K_i \cdot = \frac{1}{k_i} \quad (30)$$

where $$k_i = k_{i-1} + 1 \quad (31)$$

Another example of effective implementation might have the following form:

$$K_i = \frac{2(2 \cdot k_i - 1)}{k_i \cdot (k_i + 1)}; \quad (32)$$

A value of $k_i$ in (32) should be limited by $k_{min}$ and $k_{max}$ so that:

$$k_{min} \le k_i \le k_{max} \quad (33)$$

For example, the recommended values might read: $k_{pmin}=20$, $k_{pmax}=120$.

In case, the condition (26) is not satisfied at least for a single component, a filter bandwidth should be made wider, and a value of $k_i$ should be corrected:

$$k_i = \frac{k_{i-1}}{r}; \quad (34)$$

where r is an empirical value, equal to 2, for example.

In smoothing algorithm described by (29)-(34) all unknowns are processed with the same coefficients. However, it is also possible to use different coefficients for different unknowns.

Smoothed position increments 112 are received by 104 in FIG. 1.

Figure 3:
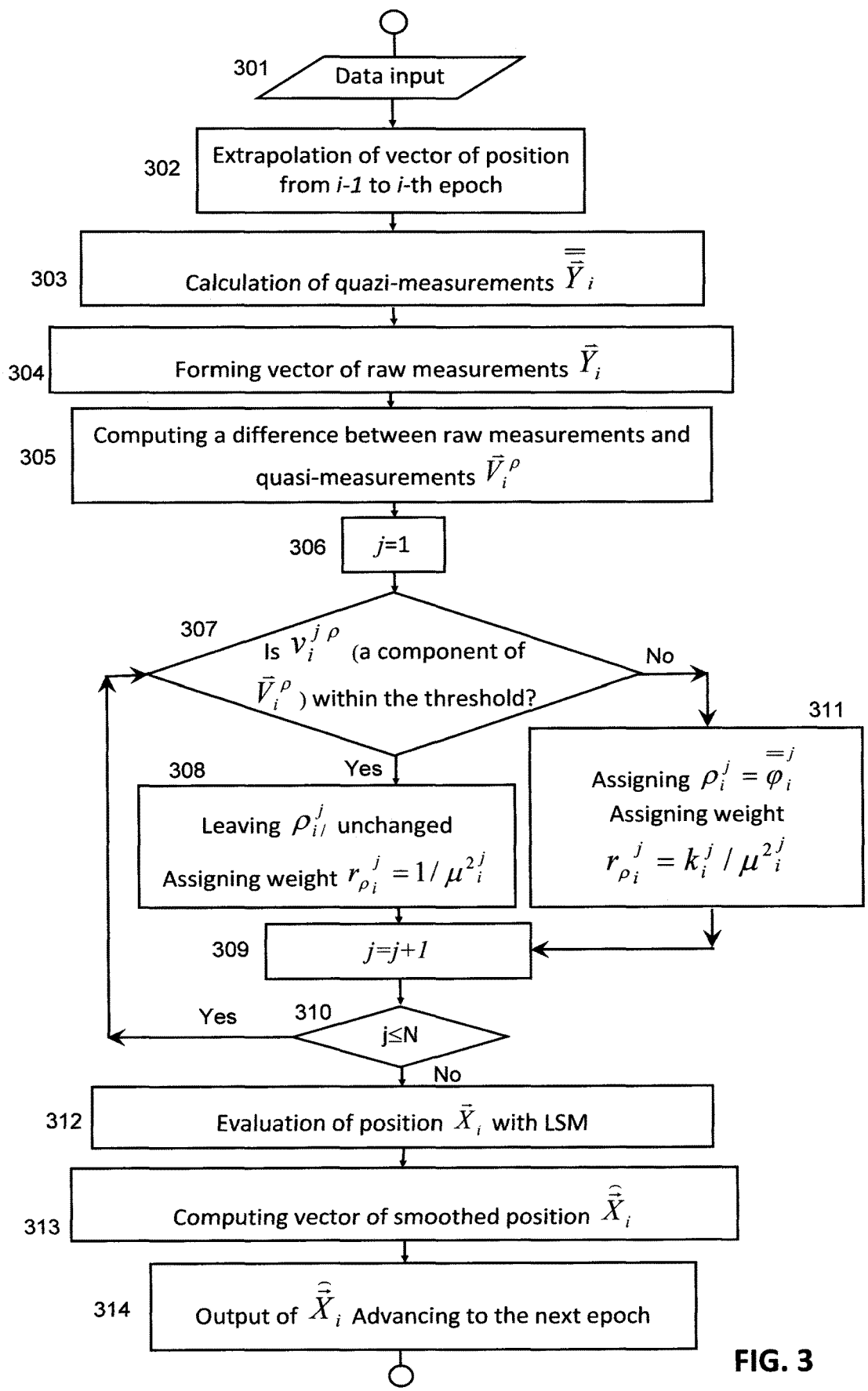
FIG. 3 shows a flowchart for code phase pseudo-range measurement processing.

FIG. 3 shows a flowchart for code phase pseudo-range measurement processing.

The algorithm is identical to the one for carrier phases in many details.

Input data 301 on the j-th epoch are:

$\vec{\bar{X}}_{i-1}$—evaluated smoothed position components on epoch i−1

$\Delta \vec{\bar{X}}_{i/i-1}$—evaluated smoothed position component increments from epoch i−1 to epoch i;

$\vec{Y}_i$—vector of code phase pseudo-range measurements;

$\Delta T_{i/i-1}$—time interval between epochs i−1 and i;

GNSS satellite positions, computed for instants of signal transmission, appropriate to epochs i and i−1.

In 302, extrapolation of position components, evaluated at epoch i−1 is made from epoch i−1 to epoch i. Extrapolation is made in accordance with equation (16). In 303, a calculation of quasi-measurements is performed. Quasi-measurements for code phase pseudo-ranges are computed using extrapolated position components in accordance with (1):

$$\vec{\tilde{Y}}_i = F(\vec{\tilde{X}}_i) \quad (35)$$

In 304, a vector of code phase pseudo-range measurements is formed:

$$\vec{Y}_i = \begin{vmatrix} \rho_i^1 \\ \rho_i^2 \\ \ldots \\ \rho_i^N \end{vmatrix} \quad (36)$$

In 305, a vector of differences between code phase pseudo-ranges and quasi-measurements for code phase pseudo-ranges is computed:

$$\vec{V}_i^\rho = \vec{Y}_i - \overline{\overline{\vec{Y}}}_i \quad (37)$$

Then, every component of $\vec{V}_i^\rho$ should be tested against a certain threshold, which is implemented in a cycle of operations of 306-311. The cycle for every j-th signal is initiated in 306. In 307, a comparison is made of absolute values of $\vec{V}_i^\rho$-vector components with respect to a certain threshold µ:

$$|v_i^{j\rho}| \le \mu \quad (38)$$

where $v_i^{j\rho}$ is a component of $\vec{V}_i^\rho$-vector for j-th signal.

The threshold value µ should be chosen based on observation conditions and a measurement quality. For example, it can be chosen close to cumulative impact of errors due to multipath, ionosphere, troposphere, satellite orbits and clocks, i.e., in the range of 10 m to 30 m.

If the condition in 307 (equation 38) is satisfied, the relevant component of $\vec{Y}_i$ remains unchanged (block 308), and this measurement component is assigned a weight computed as:

$$r_{\rho_i}^j = 1/\theta_i^{2j} \quad (39)$$

where
$r_{\rho_i}^j$ is diagonal component of the $R_{\rho,i}$ matrix, corresponding to j-th signal on j-th epoch;
$\theta_i^j$ is dispersion of j-th measurement on j-th epoch.

Then, control goes to 309 where the next measurement is chosen for analysis.

In 310, a check is made if all components of the $\vec{V}_i^\rho$-vector had been tested, and if "yes", control goes to 312. If "no"—a cycle is repeated with a next measurement.

If condition in 307 is not satisfied, the relevant component of the $\vec{Y}_i$-vector is updated in 311 as follows:

$$\rho_i^j = \underline{\rho}^j \quad (40)$$

and a new weight is assigned:

$$r_{\rho_i}^j = k_i^j / \theta_i^{2j} \quad (41)$$

where $k_i^j$ is a degradation coefficient, chosen empirically within the interval of 0 to 1.

After that, the next measurement is chosen for analysis in 309.

Within the described algorithm, a check (38) can be supplemented with more checks, e.g., (24).

In 312, evaluation of position components is made with help of LSM (equations (9) and (11)).

In 313, a smoothing of position components is implemented. Smoothed evaluations of position components are output as 113 in FIG. 1, and all the operations shown in FIG. 3 are repeated for data of the next epoch.

Smoothing of position components can be implemented in a variety of ways. Smoothing filter can of the 1st, 2nd, or higher order. Below, an example of the algorithm is given, based on adaptivity principles.

Input data for this algorithm are the evaluated position components $\vec{X}_i$, their extrapolated values $\breve{\vec{X}}_i$, and their smoothed values $\overline{\overline{\vec{X}}}_{i-1}$ evaluated at previous epoch.

At first step, a mismatch vector is calculated for position evaluated and position extrapolated with help of (16):

$$\vec{\Theta}_i = \vec{X}_i - \breve{\vec{X}}_i \quad (42)$$

Components of the mismatch vector should be tested against a threshold:

$$\text{abs}(\theta_i^k) \le \xi_i^k \quad (43)$$

where:

"abs" means computation of absolute values of $\vec{Z}_{i/i-1}$-vector components.

$\theta_i^k$ is the k-th component of the $\vec{\Theta}_i$-vector;
k=[1;m], where m is the number of unknowns (4 for the case of one GNSS);
$\xi_i^k$ is a threshold.

Threshold values $\xi_i^k$ can be chosen in a variety of ways. These values should be correspondent to errors of evaluated $\vec{X}_i$ and $\breve{\vec{X}}_i$. For the sake of simplicity, it can be assumed that errors of the smoothed values of $\breve{\vec{X}}_i$ are negligible compared to errors of $\vec{X}_i$, as such the latter ones should determine the threshold values.

The errors of $\vec{X}_i$-vector can be evaluated based on equation (9):

$$F_i = (H^T R_{\rho,i} H)^{-1} \quad (44)$$

where $F_i$ is error covariance matrix for position components on epoch i.

Based on (44) thresholds are chosen as follows:

$$\xi_i^k = l \times f_{kk} \quad (45)$$

where
$f_{kk}$ is a relevant diagonal component of the $F_i$-matrix;
l is some empirical coefficient.

A value of l should be chosen based on observation conditions, for example, its value can be set to 3 (according to 3-sigma rule).

If condition (43) is satisfied, a smoothing is made as follows:

$$\overline{\overline{\vec{X}}}_i = \vec{X}_i + K_i \cdot \vec{\Theta}_i \quad (46)$$

where $K_i$ is a certain empirical coefficient described above (equations (30)-(34)).

In case, the relationship (43) is not satisfied at least for a single component, a filter bandwidth should be made wider, and a value of $K_i$ should be corrected, for example, according to (34).

Figure 4:
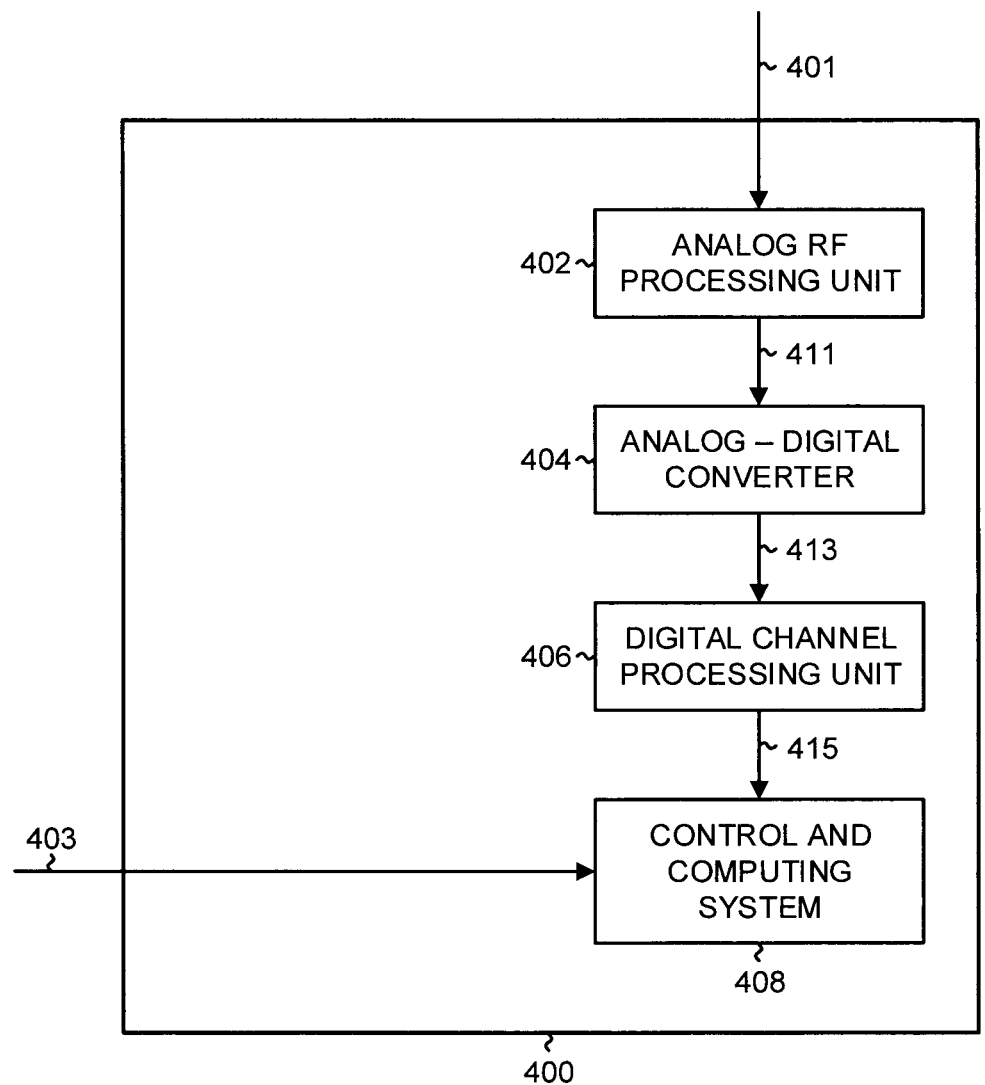
FIG. 4 shows a high-level schematic functional block diagram of an embodiment of a GNSS receiver.

FIG. 4 shows a high-level schematic functional block diagram of embodiment of a GNSS receiver 400, where the algorithms described herein can be implemented. The input analog signal 401 represents the total signal (also referred to as the combined signal, aggregate signal, or composite signal) of all the navigation signals received by the antenna (not shown) coupled to the receiver 400. The input analog signal 401 is first inputted into the analog RF processing unit 402. In the analog RF processing unit 402, the input analog signal 401 is amplified by a low-noise amplifier, filtered by a RF bandpass filter, and mixed with a local oscillator signal to generate an intermediate signal with an upconverted frequency and an intermediate signal with a downconverted frequency. An intermediate frequency bandpass filter removes the intermediate signal with the upconverted frequency and outputs the intermediate signal with the downconverted frequency; this output signal is denoted as the output analog signal 411.

The output analog signal 411 is input into the analog-to-digit converter (ADC) 404, which digitizes the analog signal 411. The combination of analog RF processing unit (402) and ADC (404) is commonly referred to as radio-frequency (RF) front-end (410).

The output digital signal 413 is then input into the digital channel processing unit 406, which generates what is referred to as raw GNSS data. These raw GNSS data are output within digital signal 415. The output digital signal 415 is input into the control and computing system 408, which computes target parameters.

The combination of digital channel processing unit (406) and control and computing system (408) is commonly referred to as a receiver digital section (412).

If the receiver operates in a DN mode, the control and computing system 408 receives the correction data 403, used to compute target parameters with better accuracy.

Figure 5:
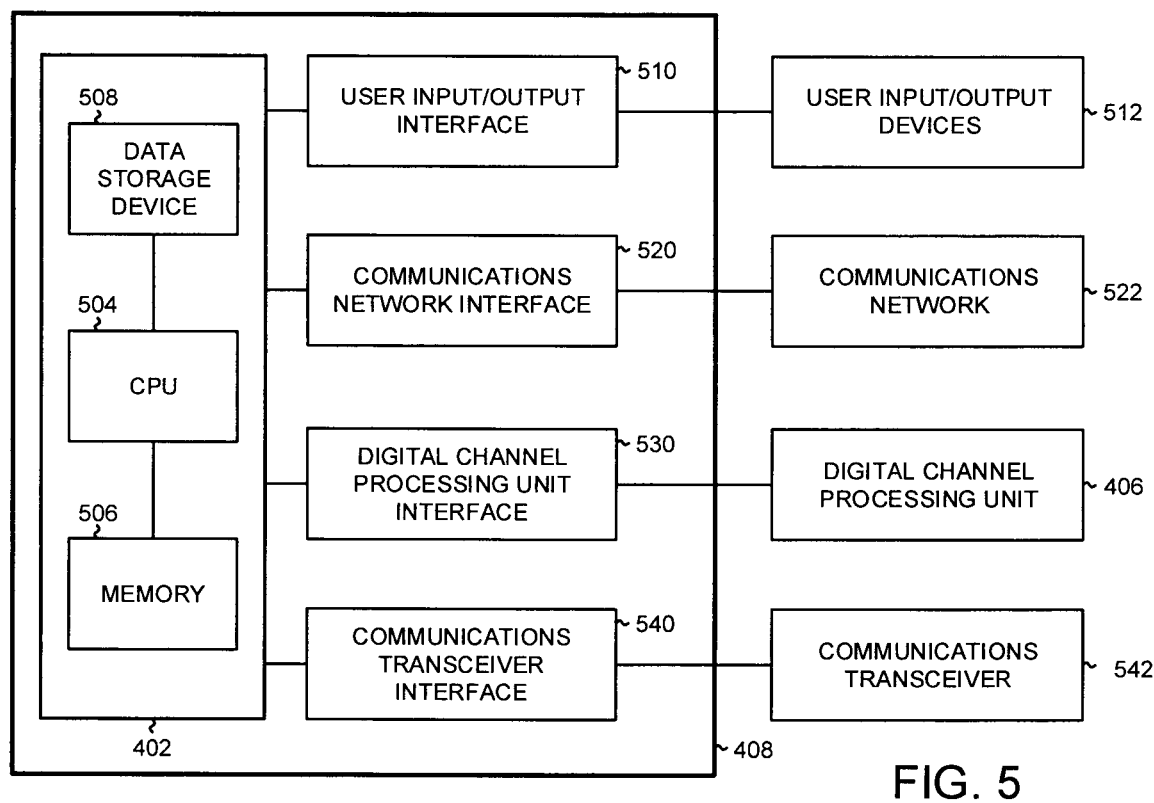
FIG. 5 shows a high-level schematic functional block diagram of a control and computing system implemented within a GNSS receiver.

An embodiment of the control and computing system 408 is shown in FIG. 5. One skilled in the art can construct the control and computing system 408 from various combinations of hardware, firmware, and software. One skilled in the art can construct the control and computing system 408 from various electronic components, including one or more general purpose processors (such as microprocessors), one or more digital signal processors, one or more application-specific integrated circuits (ASICs), and one or more field-programmable gate arrays (FPGAs).

The control and computing system 408 includes a computer 502, which includes a processor (referred to as the central processing unit (CPU)) 504, memory 506, and a data storage device 508. The data storage device 508 includes at least one persistent, non-transitory, tangible computer readable medium, such as non-volatile semiconductor memory, a magnetic hard drive, or a compact disc read only memory.

The control and computing system 408 further includes a user input/output interface 510, which interfaces the computer 502 to user input/output devices 512. Examples of user input/output devices 512 include a keyboard, a mouse, a local access terminal, and a video display. Data, including computer executable code, can be transferred to and from the computer 502 via the user input/output interface 510.

The control and computing system 408 further includes a communications network interface 520, which interfaces the computer 502 with a communications network 522. Examples of the communications network 522 include a local area network and a wide area network. A user can access the computer 502 via a remote access terminal (not shown) communicating with the communications network 522. Data, including computer executable code, can be transferred to and from the computer 502 via the communications network interface 520.

The control and computing system 408 further includes a digital channel processing unit interface 530, which interfaces the computer 502 with the digital channel processing unit 406 (see FIG. 4).

The control and computing system 408 further includes a communications transceiver interface 540, which interfaces the computer 502 with a communications transceiver 542, used to receive correction data 403.

As is well known, a computer operates under control of computer software, which defines the overall operation of the computer and applications. The CPU 504 controls the overall operation of the computer and applications by executing computer program instructions that define the overall operation and applications. The computer program instructions can be stored in the data storage device 508 and loaded into the memory 506 when execution of the program instructions is desired. The algorithms described herein can be defined by computer program instructions stored in the memory 506 or in the data storage device 508 (or in a combination of the memory 506 and the data storage device 508) and controlled by the CPU 504 executing the computer program instructions. For example, the computer program instructions can be implemented as computer executable code programmed by one skilled in the art to perform algorithms. Accordingly, by executing the computer program instructions, the CPU 504 executes the algorithms described herein.

The proposed invention covers digital multi-system GNSS signal receivers, in particular implemented in the form of analog components combined with digital components and a processor, and/or utilizing ASIC or FPGA, although other implementations (such as using discrete components and/or processor-and-software-based implementations) are also contemplated.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention.

The invention is further defined by the following claims.

REFERENCES (INCORPORATED HEREIN BY REFERENCE IN THEIR ENTIRETY)

U.S. Pat. No. 6,861,979B1 March 2005 Zhodzishsky, Mark I. et al.
U.S. Pat. No. 7,439,908 B1 October 2008 Zhodzishsky, Mark I. et al.
U.S. Pat. No. 7,710,316 B1 May 2010 Zhodzishsky, Mark I. et al.
U.S. Pat. No. 7,522,099 B2 April 2009 Zhodzishsky, Mark I. et al.
U.S. Pat. No. 8,368,593 B2 February 2013 Zhodzishsky, Mark I. et al.
U.S. Pat. No. 8,618,981 B2 December 2013 Zhodzishsky, Mark I. et al.

What is claimed is:

1. A GNSS (global navigation satellite system) signal receiver comprising:
an RF front end connected to a GNSS antenna, the RF front end including an analog-to-digit converter (ADC) converting the satellite signals into digitized form;
a digital section, including a processor receiving the digitized signals and forming raw measurements based on the digitized signals, wherein the raw measurements contain pseudo-ranges measured between GNSS receiver antenna and GNSS satellites, or their derivatives,
the processor also estimating target parameters, including three-dimensional receiver position components and an offset of receiver time relative to GNSS time,
wherein the estimating includes:
i. extrapolating the target parameters from a previous measurement epoch to a current measurement epoch using a dynamic model of the target parameters;
ii. computing a quasi-measurement for each satellite based on extrapolated target parameters and GNSS satellite positions, such that a quasi-measurement represents an estimate of the respective raw measurement based on extrapolated target parameters and GNSS satellite positions;
iii. detecting those raw measurements, which have anomalous errors by testing differences between the raw measurements and respective quasi-measurements against predefined thresholds;
iv. rejecting raw measurements with the anomalous errors;
v. substituting quasi-measurements for the rejected raw measurements;
vi. estimating the target parameters using the raw measurements that were not rejected and the quasi-measurements substituted for the rejected raw measurements; and
vii. outputting the estimated target parameters.

2. The GNSS signal receiver of claim 1, wherein
i. the raw measurements include code phase pseudo-ranges;
ii. the target parameters include three-dimensional position components, and an offset of the receiver time relative to the GNSS time; and
iii. the quasi-measurements are generated for code phase pseudo-ranges as a distance computed between a position of the GNSS satellite and extrapolated receiver position, summed with an extrapolated offset of the receiver time relative to the GNSS time.

3. The GNSS signal receiver of claim 1, wherein
i. the raw measurements include carrier phase pseudo-range increments, generated as differences between carrier phase pseudo-ranges measured at two successive measurement epochs for a given satellite;
ii. the target parameters include three-dimensional position increments evaluated between two successive measurement epochs, and an increment of an offset of receiver time relative to the GNSS time between the same two epochs;
iii. the quasi-measurements are generated for carrier phase pseudo-range increments as a difference of a geometrical distances between a GNSS satellite position and an extrapolated receiver positions computed for two successive measurement epochs, summed with an extrapolated offset increment of a receiver time relative to the GNSS time.

4. The GNSS signal receiver of claim 1, wherein signal-to-noise ratio values are used to detect and reject the raw measurements with the anomalous errors.

5. The GNSS signal receiver of claim 1, wherein the target parameters are estimated using Least Squares Method (LSM) with a combination of the raw measurements and the quasi-measurements in place of the rejected raw measurements.

6. The GNSS signal receiver of claim 4, wherein the quasi-measurements are assigned smaller weights compared with the raw measurements, to reduce an impact of the quasi-measurements onto the accuracy of the estimation of the target parameters when applying the LSM.

7. The GNSS signal receiver of claim 1, wherein the estimated target parameters are additionally smoothed with a filter, which has adaptively tuned coefficients.

8. The GNSS signal receiver of claim 6, wherein the adaptive tuning of the coefficients is based on a comparison between unsmoothed values of the target parameters and their values extrapolated from previous epochs.

9. The GNSS signal receiver of claim 6, wherein the adaptively tuned coefficients are bounded by predefined maximum and minimum values.

10. The GNSS signal receiver of claim 6, wherein the target parameters include latitudinal, longitudinal, and altitudinal position offsets with respect to a local origin, wherein the additional position offsets are measured in an Earth-Centered Earth-Fixed reference frame.

11. The GNSS signal receiver of claim 1, wherein the receiver collects raw measurements in several frequency bandwidths for the same GNSS satellite, and wherein the quasi-measurements are generated for the raw measurement of every frequency bandwidth.

12. The GNSS signal receiver of claim 1, wherein the receiver functions in a differential mode once connected to a source of differential data via a communication link, and the raw measurements and the quasi-measurements are differentially corrected prior being used for the estimating of the target parameters.

13. A method of estimating global coordinates, the method comprising:
receiving satellite signals from a plurality of GNSS satellites and feeding the satellite signals into an RF front-end of a GNSS receiver;
converting the satellite signals into digitized signals using ADC converter;
using the digitized signals to generate raw measurements;
estimating target parameters, including coordinates in three dimensions and an offset of a receiver time relative to GNSS time,
wherein the estimating includes:
i. extrapolating the target parameters from a previous measurement epoch to a current measurement epoch using a dynamic model of the target parameters;
ii. computing a quasi-measurement for each satellite based on extrapolated target parameters and GNSS satellite positions, such that a quasi-measurement represents an estimate of the respective raw measurement based on extrapolated target parameters and GNSS satellite positions;
iii. detecting those raw measurements, which have anomalous errors by testing differences between the raw measurements and respective quasi-measurements against predefined thresholds;
iv. rejecting raw measurements with the anomalous errors;
v. substituting quasi-measurements for the rejected raw measurements;
vi. estimating the target parameters using the raw measurements that were not rejected and the quasi-measurements substituted for the rejected raw measurements; and
vii. outputting the estimated target parameters.

14. The method of claim 13, wherein
i. the raw measurements include code phase pseudo-ranges;
ii. the target parameters include three-dimensional position components, and an offset of the receiver time relative to the GNSS time; and
iii. the quasi-measurements are generated for code phase pseudo-ranges as a distance computed between a position of the GNSS satellite and extrapolated receiver position, summed with an extrapolated offset of the receiver time relative to the GNSS time.

15. The method of claim 13, wherein
i. the raw measurements include carrier phase pseudo-range increments, generated as differences between carrier phase pseudo-ranges measured at two successive measurement epochs for a given satellite;

ii. the target parameters include position increments evaluated between two successive measurement epochs, and an increment of offset of receiver time relative to the GNSS time between the same two epochs;
iii. the quasi-measurements are generated for carrier phase pseudo-range increments as a difference of a geometrical distance between a GNSS satellite position and an extrapolated receiver positions computed for two successive measurement epochs, plus an extrapolated offset increment of receiver time relative to GNSS time.

16. The method of claim 13, further comprising using signal-to-noise ratio values to detect and reject the raw measurements with the anomalous errors.

17. The method of claim 13, further comprising estimating the target parameters using Least Squares Method (LSM) with a combination of the raw measurements and the quasi-measurements in place of the rejected raw measurements.

18. The method of claim 13, further comprising smoothing the estimated target parameters with a filter, which has adaptively tuned coefficients.

19. The method of claim 13, further comprising connecting to a source of differential data via a communication link and using a differential mode for calculating the coordinates, and wherein the quasi-measurements are differentially corrected prior being used for the estimating.

* * * * *